United States Patent
Holtzmann

[15] 3,693,555
[45] Sept. 26, 1972

[54] FOLDABLE SERVICE TABLE

[72] Inventor: Donald R. Holtzmann, 3107 Wheaton, Bel Ridge, Mo. 63114

[22] Filed: March 4, 1970

[21] Appl. No.: 16,484

[52] U.S. Cl. .................................... 108/25, 108/48
[51] Int. Cl. ............................................ A47b 85/00
[58] Field of Search .................... 108/25–44, 72–75, 108/115–120, 127–129, 130–132; 248/366

[56] References Cited

UNITED STATES PATENTS

| | | | |
|---|---|---|---|
| 1,533,857 | 4/1925 | Hart | 108/129 X |
| 1,600,823 | 9/1926 | Hess | 108/129 |
| 2,602,310 | 7/1952 | Hansen | 206/72 |
| 2,670,260 | 2/1954 | Watt | 108/129 |
| 2,823,087 | 2/1958 | Zimmer | 108/118 |
| 2,986,438 | 5/1961 | Smathers et al. | 108/116 |
| 3,148,636 | 9/1964 | Bloomquist et al. | 108/26 |
| 3,244,125 | 5/1966 | Mackey | 108/25 |
| 1,350,970 | 8/1920 | Hutchson | 248/346 |
| 1,684,925 | 9/1928 | Perlmutter | 248/346 |
| 2,829,705 | 4/1958 | Godshalk et al. | 108/129 H X |
| 3,156,510 | 11/1964 | Hindin et al. | 312/223 |

*Primary Examiner*—Bobby R. Gay
*Assistant Examiner*—Glenn O. Finch
*Attorney*—Cohn and Powell

[57] ABSTRACT

This service table includes a platform supported by inclined U-shaped frames pivotally mounted to each end of the platform and capable of being folded for storage. The ends of the platform are formed into apron portions extending below and outwardly of the pivot axis so that the frames bear against the aprons and stabilize the table in the erected position. The platform includes three stops, one of which is adjustable to hold various sizes of containers securely in place. The platform is also adapted to hold tapered cups.

2 Claims, 6 Drawing Figures

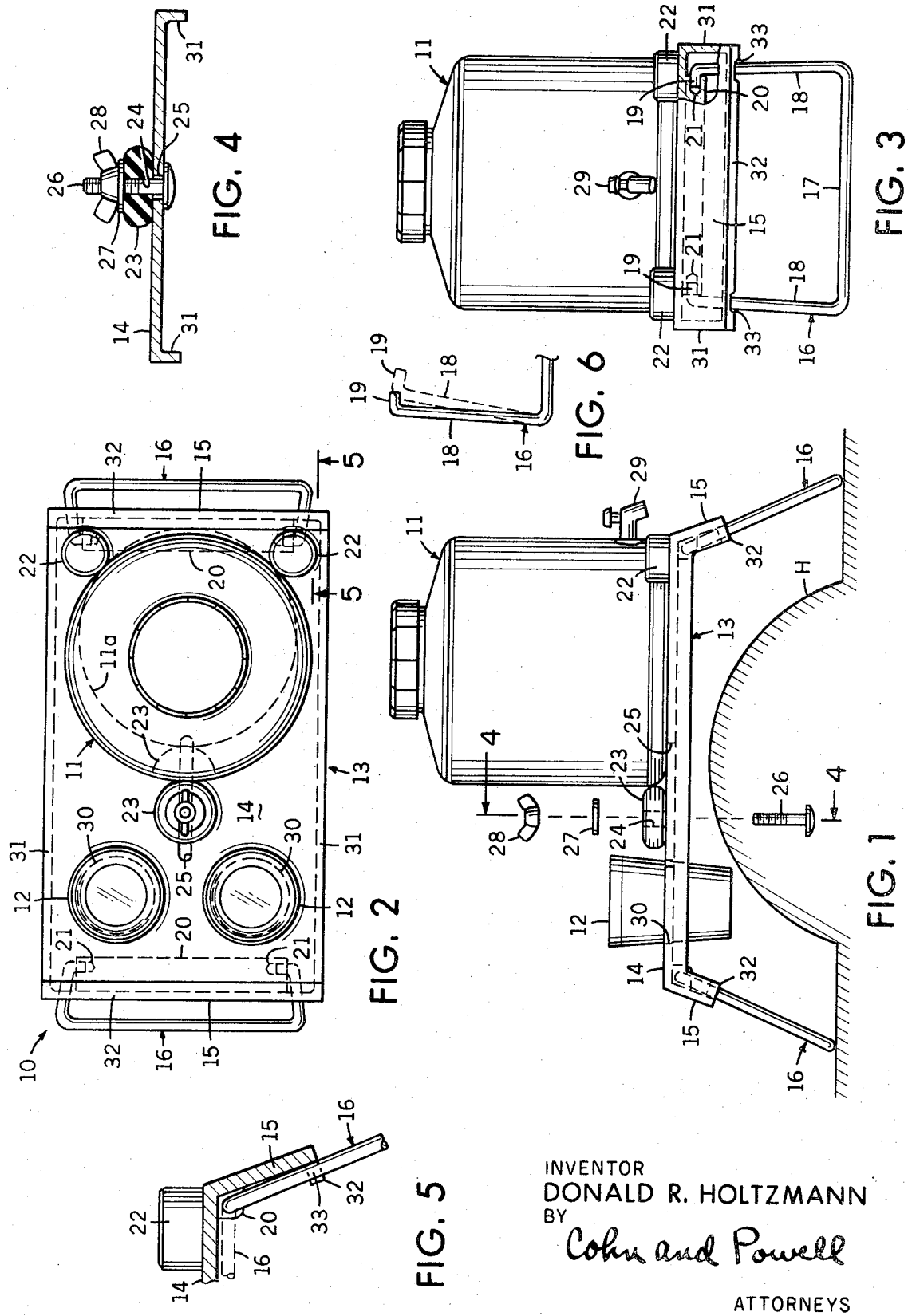

FOLDABLE SERVICE TABLE

BACKGROUND OF THE INVENTION

This invention relates in general to a folding service table and in particular, to a table for supporting a liquid container over the hump of an automobile.

Motorists often feel the need for refreshment, particularly during long trips and quite often, Thermos bottles are carried in the automobile which are filled with coffee or other thirst quenching liquid. The most convenient location for a Thermos bottle is between the driver and the passenger. Unfortunately, almost all automobiles have a transmission hump at this location and the support of a Thermos bottle and cups on this hump is impossible without the provision of auxiliary support structure.

Various tables and trays, and even specially shaped insulated containers have been manufactured which might conceivably be used in an automobile and at least two have been specifically designed to fit over an automobile hump. However, none of these appears to have been particularly successful, for example, those provided with legs suffer from the disadvantage of being inherently unstable, while those without legs are invariably so awkwardly shaped that they cannot be easily stored. Still others are so complicated in configuration that the cost of molding them from plastic material is prohibitive. Finally, most of the known tables simply are not provided with a holder adequate to support a Thermos bottle or similar container.

For reasons of economy, a table or tray which is adapted to carry one size only of Thermos container is limited in usefulness. Nevertheless, the known art does not reveal a service table capable of being easily and quickly adapted to suit a large variety of container size. And certainly, none of the known tables offer the desirable features of stability, compactness and adjustment capability in functional combination in a single unit.

SUMMARY OF THE INVENTION

This service table may be conveniently folded into a compact unit for storage. Although light in weight, the table is capable of carrying a heavy load, such as a large Thermos bottle because of its inherent rigidity.

Because of the absence of diagonal braces, the table may be conveniently straddled over the hump of an automobile and it is not limited to use with a specific hump configuration.

The table platform is adapted to various sizes of liquid containers, such as Thermos bottles, and yet such containers may be held securely in position.

The structural arrangement of parts renders the table suitable for mass production in inexpensive materials, such as molded plastic, and the table is exceedingly simple to erect, to use and to store.

The service table includes a platform having opposed ends providing abutment portions which are preferably provided by integral apron elements. Leg means pivotally connected to each end of the platform bear against the abutment portions and the leg means are thereby provided with stability in their operative platform supporting position. The legs are inwardly foldable to a storage position.

Engagement means are provided on the platform which include a plurality of stops, at least one of which is translationally adjustable relative to the platform so that the engagement means may be adapted to suit various container sizes.

Each leg means includes a pair of transversely interconnected leg elements, each having a pintle portion receivable by associated socket portions provided on the platform to pivotally mount the legs to said platform.

The legs are preferably provided by a U-shaped frame pivotally attached to each end of the platform and having a ground bearing portion outwardly disposed of the associated pivot axis in the operative platform supporting position. Each frame is inclined relative to the platform and bears against the platform apron elements, which furnish a couple resistance precluding outward movement of the frames and thereby providing the table with inherent stability. The pintle portions provided on each U-shaped frame are spaced apart from each other a greater distance than the compatible platform socket portions, before mounting, resulting in a resilient connection between the frames and the platform which precludes inadvertent disconnection of the frames.

Each of the opposed ends of the platform include second abutment portions adjacently disposed of each leg and engageable thereby at a point disposed in spaced relation from the pivot axis to provide couple resistance to the transverse sway.

The platform includes a slot. At least two container engageable stops are fixed to the platform and a third adjustable stop includes a stem slidably received by the slot to permit said adjustable stop to be clamped at a selected location along the length of the slot. The fixed and adjustable stops thereby provide three points of support capable of accommodating a variety of container sizes. The platform also includes a plurality of apertures adapted to hold tapered cups in place, secure from tipping.

BRIEF DESCRIPTION OF THE DRAWING

FIG. 1 is a side elevational view of the table in its erected position straddling an automobile hump;

FIG. 2 is a plan view of the table;

FIG. 3 is an end elevational view of the table;

FIG. 4 is a sectional elevational view of the platform taken on line 4—4 of FIG. 2;

FIG. 5 is a fragmentary, sectional elevational view taken on line 5—5 of FIG. 2, and FIG. 6 is a fragmentary view of a support frame indicating initial and final positions of the frame legs.

DESCRIPTION OF THE PREFERRED EMBODIMENT

Referring now by characters of reference to the drawing and first to FIGS. 1 and 2, it will be understood that the folding table, generally indicated by numeral 10, is intended to carry a liquid container, such as a Thermos bottle 11 and a pair of tapered cups 12.

The table 10 includes a platform 13 having a substantially flat intermediate portion 14 and depending end portions which are provided in the preferred embodiment by inclined, integral aprons 15. The platform 13 is supported at each end by substantially U-shaped frames 16 constituting leg means. Each frame 16 includes a bight 17 constituting a ground bearing portion and a pair of legs 18, which are sufficiently long to raise the platform 13 above an automobile hump H.

Each of the frames 16 is pivotally connected to the platform 13, so that said frames 16 may be folded underneath the platform 13 into a storage condition. With the frames 16 in this compact storage condition, indicated in broken outline in FIG. 5, the table 10 may be conveniently slipped underneath an automobile seat and stored there until required.

The pivotal connection between the frames 16 and the platform 13 is achieved by providing inwardly turned pintle portions 19 at the remote end of each leg 18. The pintle portions 19 are received by compatible socket portions 21 provided at each end of an elongate fillet strip 20 disposed between each apron 15 and the platform intermediate portion 14. FIG. 6 indicates in broken outline the initial configuration of each U-shaped frame 16. It will be understood that the opposed legs 18 of each frame 16 are capable of being sprung outwardly to enable the pintle portions 19 to be inserted within associated compatible sockets 21 and the legs 18 are then released. When released, the legs are resiliently held in position which prevents them from being inadvertently disconnected from the platform 13 in the assembled position. As shown clearly in FIG. 1, the U-shaped frames 16 are outwardly inclined. The weight of the platform 13 including the Thermos bottle 11 is distributed to the frames 16 and a component of the weight therefore acts outwardly on said frames 16. This outward force is resisted by aprons 15 below the pivotal connection of said frames 16 because the outer portions of the legs 18 bear against the lower portions of associated aprons 15. The aprons 15 thereby act as abutments determining the support position of the frames 16 and providing couple resistance to outward movement of the frames 16 to insure that the table 10 remains stable without the need for fasteners. With the above arrangement of inclined frames 16, the stability of the table 10 against collapse from inward rotation of the frames 16 is increased as the load carried by the table 10 increases because in order for such rotation to take place, the couple resistance must be overcome.

The platform 13 is preferably peripherally stiffened by side flange elements 31 and end flange elements 32. As shown in FIGS. 3 and 5 particularly, the end flange elements 32 are notched to provide slots 33 receiving associated legs 18. The flange material on each side of the slots 33 acts as a lateral abutment means which, being spaced from the connection of the frames 16 to the platform 13, provides couple resistance tending to stiffen the legs 18 and preclude sway in the direction of automobile travel. It will be understood that the connection of the U-shaped frames 16 to the platform 13 thereby inhibits sway of the table 10 in two directions and that inherent stability is achieved even though said frames 16 may be formed from relatively thin rods.

The Thermos bottle 11, which includes a spigot 29, is disposed on the platform 13 that that spigot 29 overhangs the end of said platform 13. Because of the overhang, a cup such as those indicated by numeral 12, may be conveniently filled from the spigot 29. The Thermos bottle 11 is held in place by means of three boss-like stop elements which engage the lower peripheral area of the Thermos bottle bottle 11 and constitute engagement means. Two of the stops, indicated by numeral 22, are fixed to the platform 13 and are preferably integral with said platform 13. A third stop, indicated by numeral 23, is adjustably connected to the platform 13 for selective movement thereon and hence three engagement points are provided which may be adapted to suit various sizes of Thermos bottles 11 by simply adjusting the location of the movable stop 23. It will be understood that stop 23 has a substantially annular comfiguration and includes an aperture 24. The platform intermediate portion 14 includes an elongate slot 25 and the stop 23 is movably attached to said intermediate portion 14 by a bolt 26, which constitutes a stem received by the elongate slot 25. The stop 23 may be clamped at any desired location relative to the slot 25 by means of a washer 27 and a wing nut 28 used in conjunction with the bolt 26.

FIG. 2 indicates in broken outline the relationship of parts when a Thermos bottle 11a having a smaller diameter than the Thermos bottle 11, is clamped in place on the platform 13.

The intermediate platform portion 14 includes a pair of apertures 30 adapted to receive conventional tapered cups 12. The apertures 30 have a diameter less than that of the mouth of the cups 12 so that said cups 12 project below the surface of the platform and are thereby precluded from tipping.

It is thought that the structural features and functional advantages of this service table have become fully apparent from the foregoing description of parts, but for completeness of disclosure, the use of the table will be briefly summarized.

When the table 10 is not in use, it may be converted into a compact storage unit by simply folding the U-shaped frames 16 inwardly. It is not necessary to remove the adjustable stop 23 because the height of this stop 23 is about the same as the fixed stops 22 which are relatively short.

When it is again desired to use the table 10, the frames 16 are simply folded outwardly and the table 10 may be erected to straddle the automobile hump H, as shown in FIG. 1. The weight of the platform and of its contents tends to urge the legs 18 against the end aprons 15 and the table is thus automatically stabilized. The U-shaped configuration of the frames 16 provides the table 10 with considerable rigidity in the direction of automobile travel. This rigidity is increased by providing intermediate lateral support for the legs 18, which are received within associated slots 33.

The frames 16 may be removed from the platform 13 if desired by simply applying outward pressure to associated legs 18. The space between the ends of the fillet strip 20 and adjacent side flange 31 facilitates removal of said frames 16.

The adjustable stops on the platform 13 may be located in any desired position to hold a specific size of Thermos bottle 11 and the length of the slot 25 is sufficient to accommodate a wide range of container size while at the same time maintaining the effective holding capability of three points of support. Apertures 30 provide a convenient means of holding conventional tapered cups 12 and insure that such cups 12 do not tip over while the automobile is in motion.

I claim as my invention:

1. In a service table and removable container:
   a. a substantially cylindrical container including a lower peripheral portion, b. platform means including opposed ends and a slot,
c. leg means connected to each end of the platform means,
d. engagement means on the platform means to engage and hold the container on top of the platform means the engagement means including:
  1. a pair of spaced stops fixedly attached to the platform means and engaging the lower peripheral portion of the container at two points of support on either side of said slot,
  2. a single movable stop translationally adjustable along the slot and selectively engaging the lower peripheral portion of the container at a third point of support, and
  3. said stops abutting but not overlying said lower peripheral portion to preclude lateral movement of the container in any direction yet permitting release of the container by translational adjustment of said single movable stop.

2. In a service table and removable container:
a. a substantially cylindrical container including a lower peripheral portion,
b. platform means including a substantially elongate flat intermediate portion and integral, downwardly inclined end apron portions providing depending stub legs,
c. a pair of substantially U-shaped frames, pivotally connected to the platform means inwardly of the apron portions, the frames being inwardly movable from an inclined support position to a folded storage position, each frame including a bearing portion engageable with the apron portion below the pivot axis to provide said frames with couple resistance against collapse in the support position, the frames having a length less than one-half of the length of the platform means and being substantially shielded by the end apron portions in the folded storage position, and
d. engagement means on the platform means to engage the lower peripheral portion of the container and hold the container on top of the platform means.

* * * * *